United States Patent
Sun et al.

(10) Patent No.: US 7,394,969 B2
(45) Date of Patent: Jul. 1, 2008

(54) SYSTEM AND METHOD TO COMPOSE A SLIDE SHOW

(75) Inventors: Zhaohui Sun, Rochester, NY (US);
Alexander C. Loui, Penfield, NY (US);
Jonathan K. Riek, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1191 days.

(21) Appl. No.: 10/316,556

(22) Filed: Dec. 11, 2002

(65) Prior Publication Data
US 2004/0114904 A1   Jun. 17, 2004

(51) Int. Cl.
*H04N 5/91*   (2006.01)
(52) U.S. Cl. ........................................... 386/69
(58) Field of Classification Search ................... 345/98, 345/660, 204, 619, 103, 629; 386/46, 111, 386/125, 69; 382/167, 165, 100, 125, 113; 375/240.27, 240; 348/14.13; 710/56; 715/723; 358/506
See application file for complete search history.

(56) References Cited

U.S. PATENT DOCUMENTS

| | | | |
|---|---|---|---|
| 4,825,301 A | | 4/1989 | Pape et al. |
| 4,945,406 A | * | 7/1990 | Cok .......................... 358/506 |
| 5,218,455 A | | 6/1993 | Kristy |
| 5,517,250 A | * | 5/1996 | Hoogenboom et al. .. 375/240.27 |
| 5,539,452 A | * | 7/1996 | Bush et al. ............... 348/14.13 |
| 5,555,098 A | | 9/1996 | Parulski |
| 5,740,304 A | * | 4/1998 | Katsuyama et al. ........... 386/46 |
| 5,892,507 A | | 4/1999 | Moorby et al. |
| 6,081,262 A | | 6/2000 | Gill et al. |
| 6,081,609 A | * | 6/2000 | Narioka ...................... 382/113 |
| 6,084,582 A | | 7/2000 | Qureshi et al. |
| 6,349,154 B1 | | 2/2002 | Kleihorst |
| 6,587,505 B1 | * | 7/2003 | Nozawa et al. .............. 375/240 |
| 6,646,655 B1 | * | 11/2003 | Brandt et al. ............... 715/723 |

(Continued)

FOREIGN PATENT DOCUMENTS

EP   0 731 600 A2   2/1996

(Continued)

OTHER PUBLICATIONS

PCT International Application—Publication No. WO 00/35194, entitled: Method for Encloding Multiple Audio Streams, Enreach Technololgy, Inc.

(Continued)

*Primary Examiner*—Prabodh Dharia
(74) *Attorney, Agent, or Firm*—Frank Pincelli

(57) ABSTRACT

A method of composing a multimedia slide show. In a preferred embodiment, the method comprises the steps of: selecting a plurality of digital images; encoding each of the plurality of digital images to generate a normal resolution image portion and a high resolution image portion; multiplexing each corresponding normal and high resolution image portion to generate a single high resolution still image; determining a time parameter for each of the high resolution still images; selecting an audio portion for at least one of the plurality of digital images; concatenating the plurality of high resolution still images to generate a video bitstream; generating an audio bitstream by encoding the audio portion; and multiplexing the video bitstream and audio bitstream to generate the multimedia slide show.

30 Claims, 9 Drawing Sheets

U.S. PATENT DOCUMENTS

| | | | |
|---|---|---|---|
| 6,980,691 B2 * | 12/2005 | Nesterov et al. | 382/165 |
| 2001/0028725 A1 * | 10/2001 | Nakagawa et al. | 382/100 |
| 2003/0007687 A1 * | 1/2003 | Nesterov et al. | 382/167 |
| 2003/0007784 A1 * | 1/2003 | Loui et al. | 386/111 |
| 2003/0113096 A1 * | 6/2003 | Taira et al. | 386/46 |
| 2003/0152371 A1 * | 8/2003 | Gadre et al. | 386/125 |
| 2003/0154333 A1 * | 8/2003 | Gadre et al. | 710/56 |
| 2003/0206729 A1 * | 11/2003 | Loui et al. | 386/125 |
| 2006/0064716 A1 * | 3/2006 | Sull et al. | 725/37 |

FOREIGN PATENT DOCUMENTS

| | | |
|---|---|---|
| EP | 0 967 613 | 12/1999 |
| EP | 1 041 566 | 4/2000 |

OTHER PUBLICATIONS

U.S. Appl. No. 09/885,577, Entitled: System and Method for Authorizing a Multimedia Enabled Disc, filed Jun. 20, 2001 by Loui et al.

* cited by examiner

SYSTEM AND METHOD TO COMPOSE A SLIDE SHOW

CROSS REFERENCE TO RELATED APPLICATION

Reference is made to commonly assigned application U.S. Ser. No. 09/885,577 entitled "SYSTEM AND METHOD FOR AUTHORING A MULTIMEDIA ENABLED DISC", and filed on Jun. 20, 2001 in the names of Loui et al, and which is assigned to the assignee of this application.

FIELD OF THE INVENTION

The invention relates generally to the field of multimedia encoding and rendering.

BACKGROUND OF THE INVENTION

The use of digital cameras has increased in recent years. Accordingly, the volume of commercial and consumer held digital image files has also increased. Much like the problem of a closet full of shoe boxes of randomly held photographic prints, in the digital environment, there are computer "shoe boxes" full of randomly stored digital images. In addition, there is an increasing use of VCD and DVD players and an increasing number of available digital images and video clips. This leads to a need for a system and/or method of locating, categorizing, and sharing of digital images that is easy and fun as well as being cost and time efficient.

One approach is to compose digital images, text, speech annotations, and music clips on compact discs (CD) or digital video discs (DVD), which can be played back as multimedia albums/programs on a television using a video CD player or DVD player.

Such a television-centered system differs from the popular computer-centered systems. For example, the Kodak Picture CD product (available from Eastman Kodak Company) provides digital image sharing and viewing capabilities employing a computer. However, the CD format of the Kodak Picture CD does not, as currently configured, play on a television.

It is known to encode audio and video information as a VCD compatible program and transfer the program onto a CD in an ISO 9660 format. Such a CD is playable on VCD/DVD players and computer systems. The VCD encoding employs a particular MPEG-1 standard with the target applications having bit rates of no more than 1.5 Mbits per second. With such a bit rate constraint, the image resolution is limited to 352×240 on NTSC system (which is popular in the United States and Japan) and 352×288 on PAL system (which is popular in Europe and China). The resolution of 352×240 on NTSC and 352×288 on PAL are often referred to as the normal resolution, and the counterpart of spatial resolutions of 704×480 on NTSC and 704×575 on PAL are often referred to as the high resolution.

The particular MPEG-1 standard is intended to encode motion picture sequences at a CD-ROM bit rate having an entertainment quality. Therefore, it is typically not a suitable standard for displaying still images, such as a multimedia album or slide show, on a television. When a video sequence is rendered at a high frame rate, for example 29.97 frame/second for NTSC or 25 frames/second for PAL, the temporal filtering of fast moving frames conceals most of the spatial distortion. However, when a still image is subsampled to the normal resolution, encoded by an MPEG-1 encoder (block-based JPEG-like compression for intra frame), and displayed on a television, the distortion, such as blocking artifacts, can be pronounced.

An audio and video program can be encoded on a DVD using the MPEG-2 standard since a DVD has much higher capacity than a CD, and therefore can afford to store higher spatial resolutions (i.e., 720×480 on NTSC system, and 720×576 on PAL system). However, the DVD technology is more expensive and more complex, as compared to the CD technology. Thus, the DVD media and the writing devices are often viewed as being too expensive for most consumers.

U.S. Pat. No. 6,084,582 (Qureshi) titled "METHOD AND APPARATUS FOR RECORDING A VOICE NARRATION TO ACCOMPANY A SLIDE SHOW" discloses a method and apparatus for recording and digitizing audio inputs as audio segments which are stored and associated with the corresponding slide. The slide show is a digital tile (e.g., a PowerPoint) intended for play back on a personal computer. U.S. Pat. No. 5,892,507 (Moorby) titled "COMPUTER SYSTEM FOR AUTHORING A MULTIMEDIA COMPOSITION USING A VISUAL REPRESENTATION OF THE MULTIMEDIA COMPOSITION" discloses a computer system for composing and displaying a multimedia presentation having one or more multimedia events through graphical user interface. U.S. Pat. No. 6,081,262 (Gill) titled "METHOD AND APPARATUS FOR GENERATING MULTI-MEDIA PRESENTATIONS" discloses a document layout paradigm to regulate the spatial relationships among the plurality of objects contained within the multimedia presentation. In contrast to the present invention, these references are not directed to composing and rendering audio and still pictures as a high resolution slideshow displayable on a consumer electronic device (such as a DVD or VCD player) and computers having appropriate decoder, with enhanced image quality and audio manipulation.

Patent No. WO/0035194, titled "METHOD FOR ENCODING MULTIPLE AUDIO STREAM", discloses a method and system for encoding still pictures or video streams with multiple sound streams, allowing a medium (e.g., compact disc) to be encoded with a large number of audio information. The method enables the storing and playing back of a large number of songs with video information on a compact disc. In contrast, the present invention is directed to enhancing image rendering quality (by image enhancement and composition, and high resolution slide show rendering) as well as the audio/visual enjoyment experience (by audio composition of voice annotation and music/song clips, and combination of audio/visual entertainment).

The term "high resolution" in the present invention refers to images with spatial resolutions of 704×480 on NTSC system and 704×576 on PAL system, which is related to the normal resolution of 352×240 on NTSC and 352×288 on PAL system, as specified by the Video Compact Disc specification. In contrast, several prior disclosures intended to enhance the resolution/quality of a single image by the combination of a group of still images. For example, U.S. Pat. No. 4,825,301, titled "APPARATUS FOR ENCODING AND DECODING HIGH RESOLUTION STILL IMAGES AND VIDEO IMAGES FOR RECODING ON A STANDARD STORAGE MEDIA", discloses an apparatus for encoding still images on a conventional recording media (such as a VCR tape) by dividing the signals into a plurality of groups of signals, with each group corresponding to a plurality of different picture elements of the image. U.S. Pat. No. 6,349,154, titled "METHOD AND ARRANGEMENT FOR CREATING A HIGH-RESOLUTION STILL PICTURE", discloses a method for creating a high-resolution still picture from a sequence of lower-resolution pictures after motion-compensated predictive coding. EP Patent No. 0731600, titled "SYSTEM FOR CREATING A HIGH RESOLUTION IMAGE FROM A SEQUENCE OF LOWER RESOLUTION MOTION IMAGES", discloses a method for creating a high resolution still picture from a video sequence based on the projections onto a convex scheme.

The present invention is intended to overcome the disadvantages noted above. More particularly, there exists a need for an easy, enjoyable, and cost and time-effective multimedia composition system and method, which can provide higher image and slideshow rendering quality. The present invention is directed to a system and method for composing audio and video information as a multimedia slideshow/album on a compact disc with higher spatial resolution and higher image quality than the normal resolution counterparts, which can be played back on VCD/DVD players. As such, the present invention provides such an easy, enjoyable, and cost and time-effective multimedia composition system and method.

SUMMARY OF THE INVENTION

An object of the present invention is to provide a system and method for composing audio and video information as a multimedia slideshow/album on a compact disc with higher spatial resolution and higher image quality than the normal resolution counterparts, which can be played back on VCD/DVD players.

Another object of the present invention is to provide such a multimedia composition system and method that is easy, enjoyable, and cost and time-effective.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method of composing a slide show. The method includes the steps of: accessing a plurality of digital images; encoding each of the plurality of digital images to generate a normal resolution image portion and a high resolution image portion; multiplexing each corresponding normal and high resolution image portion to generate a single high resolution still image; determining a time parameter for each of the high resolution still images; and concatenating the plurality of high resolution still images to generate a silent slide show in accordance with the determined time parameters.

According to another aspect of the invention, there is provided a method of composing a multimedia slide show. The method includes the steps of electing a plurality of digital images; encoding each of the plurality of digital images to generate a normal resolution image portion and a high resolution image portion; multiplexing each corresponding normal and high resolution image portion to generate a single high resolution still image; determining a time parameter for each of the high resolution still images; selecting an audio portion for at least one of the plurality of digital images; concatenating the plurality of high resolution still images to generate a video bitstream; generating an audio bitstream by encoding the audio portion; and multiplexing the video bitstream and audio bitstream to generate the multimedia slide show.

According to a further aspect of the invention, there is provided a system of composing a slide show. The system includes: means for accessing a plurality of digital images; means for encoding each of the plurality of digital images to generate a normal resolution image portion and a high resolution image portion; means for multiplexing each corresponding normal and high resolution image portion to generate a single high resolution still image; means for determining a time parameter for each of the high resolution still images; and means for concatenating the plurality of high resolution still images to generate a silent slide show in accordance with the determined time parameters.

According to yet a further aspect of the invention, there is provided a system of composing a multimedia slide show. The system includes: means for selecting a plurality of digital images; means for encoding each of the plurality of digital images to generate a normal resolution image portion and a high resolution image portion; means for multiplexing each corresponding normal and high resolution image portion to generate a single high resolution still image; means for determining a time parameter for each of the high resolution still images; means for selecting an audio portion for at least one of the plurality of digital images; means for concatenating the plurality of high resolution still images to generate a video bitstream; means for generating an audio bitstream by encoding the audio portion; and means for multiplexing the video bitstream and audio bitstream to generate the multimedia slide show.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
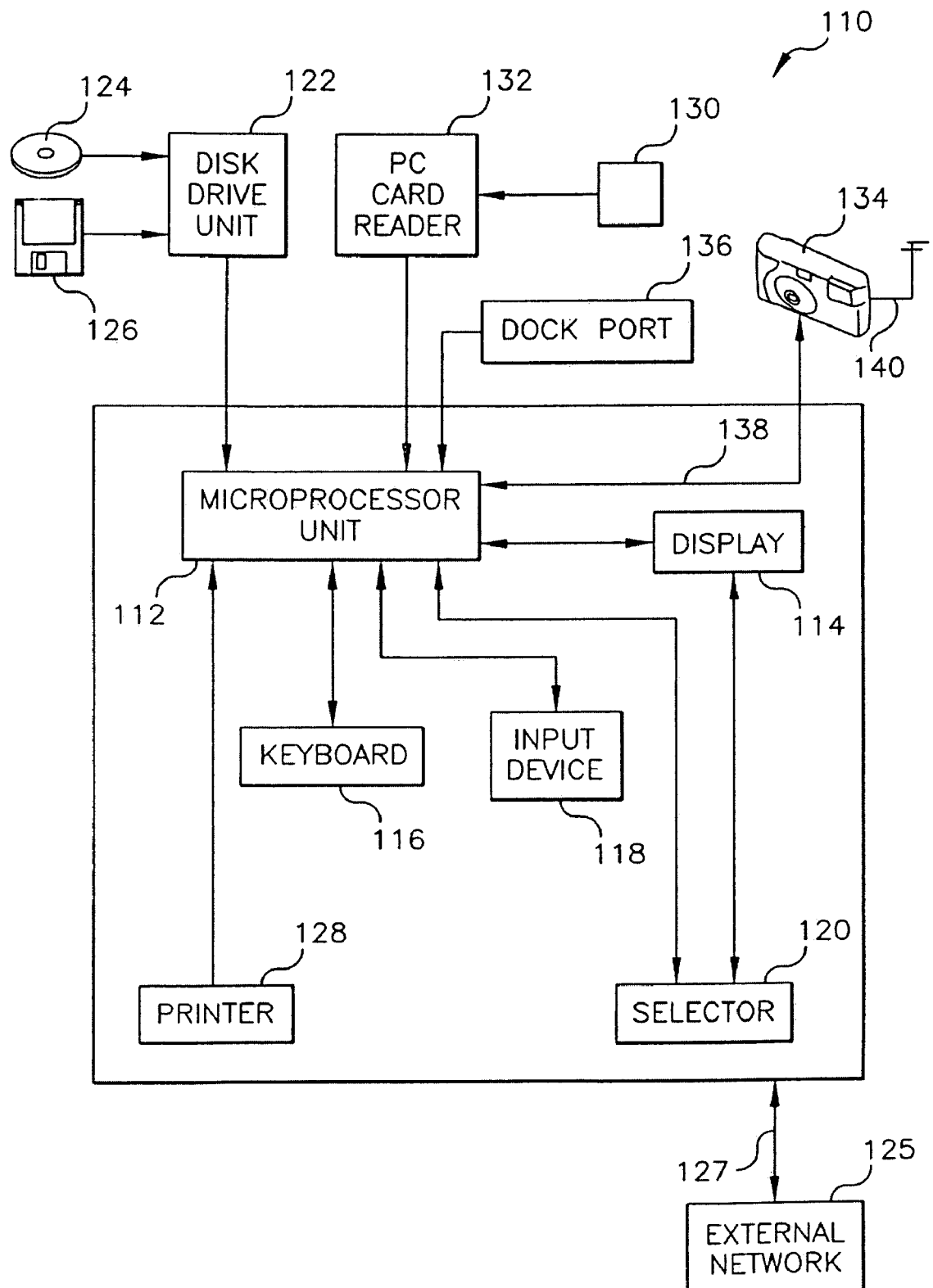
FIG. 1 generally illustrates features of a system in accordance with the present invention.

The following is a detailed description of the preferred embodiments of the invention, reference being made to the drawings in which the same reference numerals identify the same elements of structure in each of the several figures.

Generally, the present invention provides a system and method of composing digital audio clips and images as a high resolution multimedia program, playable on a VCD/DVD player or a computer system with a software/hardware player, that includes the features of: image enhancement and composition; audio composition; composition of a single high resolution still picture; composition of a silent slide show displaying a number of still images sequentially; and composition of a multimedia slide show with audio.

The present invention has the following advantages. The quality of the multimedia rendering and entertainment of the present invention is enhanced by image enhancement and composition, audio composition, high-resolution still picture composition and combined audio and video coding. By using the present invention's bit allocation scheme, the present invention provides a similar spatial resolution of a DVD with the use of a lower cost media (i.e., compact disc vs. DVD), device (CD writer vs. DVD writer) and technology (MPEG-1 vs. MPEG-2). With the present invention, the encoded bitstreams can be played back on VCD/DVD players. In addition, the high-resolution program has approximately four times higher resolution than the normal resolution counterpart, which greatly enhances the image rendering quality.

It is noted that a preferred embodiment in accordance with the present invention will be described in terms that would typically be implemented as a software program. Those skilled in the art will recognize that the equivalent of such software may also be constructed in hardware. Because image manipulation algorithms and systems are well known, the description of the present invention will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the present invention in the following materials, software not specifically shown, suggested or described herein that is useful for implementation of the invention is conventional and within the ordinary skill in such arts.

It is also noted that, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

It is further noted that the present invention is preferably utilized on any well-known computer system, such as a personal computer. Consequently, such a computer system will not be discussed in detail herein. It is also instructive to note that the images can be directly input into the computer system (for example by a digital camera) or digitized before input into the computer system (for example by scanning an original, such as from scanning a silver halide print or negative).

It is noted that a slide show or slideshow is a collection of images. This slide show can also be referred to as an electronic photo album, digital photographic album, or multimedia album. Such slide shows/albums can include video clips, audio clips, voice annotations, text, music clips, and the like, to enhance the context and presentation of the album. As such, the slideshow/album can be referred to as a multimedia slide show or multimedia album. Each "slide" of the slide show corresponds to one screen or display showing one of the collection of images and/or video clips, wherein the slide show sequentially displays a series of the still images and/or video clips.

Referring to FIG. 1, there is illustrated a system 110 for implementing the present invention. Although system 110 is shown for the purpose of illustrating a preferred embodiment, the present invention is not limited to the system 110 shown, but may be any electronic processing system such as a home computer, kiosk, retail or wholesale photofinishing equipment, or any other system for the processing of digital images. System 110 includes a microprocessor-based unit 112 for receiving and processing software programs and for performing other processing functions. A display 114 is electrically connected to microprocessor-based unit 112 for displaying user-related information associated with the software, such as by means of a graphical user interface. A keyboard 116 can be connected to microprocessor-based unit 112 for permitting a user to input information to the software. As an alternative to using keyboard 116 for input, a mouse 118 or other input device may be used for moving a selector 120 on display 114 and for selecting an item on which selector 120 overlays, as is well known to those skilled in the art.

A compact disc-read only memory (CD-ROM) 124, which typically includes software programs, is inserted into the microprocessor-based unit for providing a means of inputting the software programs and other information to microprocessor-based unit 112. In addition, a floppy disk 126 may also include a software program, and is inserted into microprocessor-based unit 112 for inputting the software program. Compact disc-read only memory (CD-ROM) 124 or floppy disk 126 may alternatively be inserted into an externally located disk drive unit 122 that is electronically connected to the microprocessor-based unit 112. Still further, microprocessor-based unit 112 may be programmed, as is well known in the art, for storing the software program internally. Microprocessor-based unit 112 may also have a network connection 127, such as an internet connection, local area network, or telephone line, to an external network of one or more computers or other systems 125. A printer 128 may also be connected to microprocessor-based unit 112 for printing a hardcopy of the output from system 110.

Images can be displayed on display 114 by means of a personal computer card (PC card) 130, such as, as it was formerly known, a PCMCIA card (based on the specifications of the Personal Computer Memory Card International Association) which contains digitized images electronically embodied in the card 130. PC card 130 is ultimately inserted into microprocessor-based unit 112 for permitting visual display of the image on display 114. Alternatively, PC card 130 can be inserted into an externally located PC card reader 132 connected to microprocessor-based unit 112. Images may also be input to system 10 by means of compact disc 124, floppy disk 126, or network connection 127. Any images stored on PC card 130, floppy disk 126 or compact disc 124, or input through network connection 127, may have been obtained from a variety of sources known to those skilled in the art, such as a digital camera (not shown) or a scanner (not shown). Images may also be input directly from a digital camera 134 by means of a camera docking port 136 connected to microprocessor-based unit 112 or directly from digital camera 134 by means of a cable connection 138 to microprocessor-based unit 112 or by means of a wireless connection 140 to microprocessor-based unit 112.

MPEG-1 is a well-known standard. To encode still pictures (i.e., digital still images) using MPEG-1, only the I-frames (intra frames) need to be coded and there are no P-frames (prediction frames) or B-frames (bi-directional prediction frames). To assure no underflow and overflow of the decoding buffer, padding packets need to be inserted to maintain a constant bit rate. The padding packets contain all 0×FF (all hexadecimal values are preceded by 0×) which are stuffing bytes that are ignored by decoders. This results in an undesirable situation. On the one hand, the spatial resolution of I-frames is limited to normal resolution with possible blocking artifacts. On the other hand, extra stuffing bytes have to be inserted to maintain the required bit rate. The present invention employs the stuffing bytes to increase the resolution of I-frame, accomplished by the Video CD 2.0 specification of High Resolution Still. By trading the bits allocated to motion to I-frame, the spatial resolution of the still pictures and multimedia slideshows can be coded at four times higher resolution, thereby giving much higher rendering quality.

Figure 2:
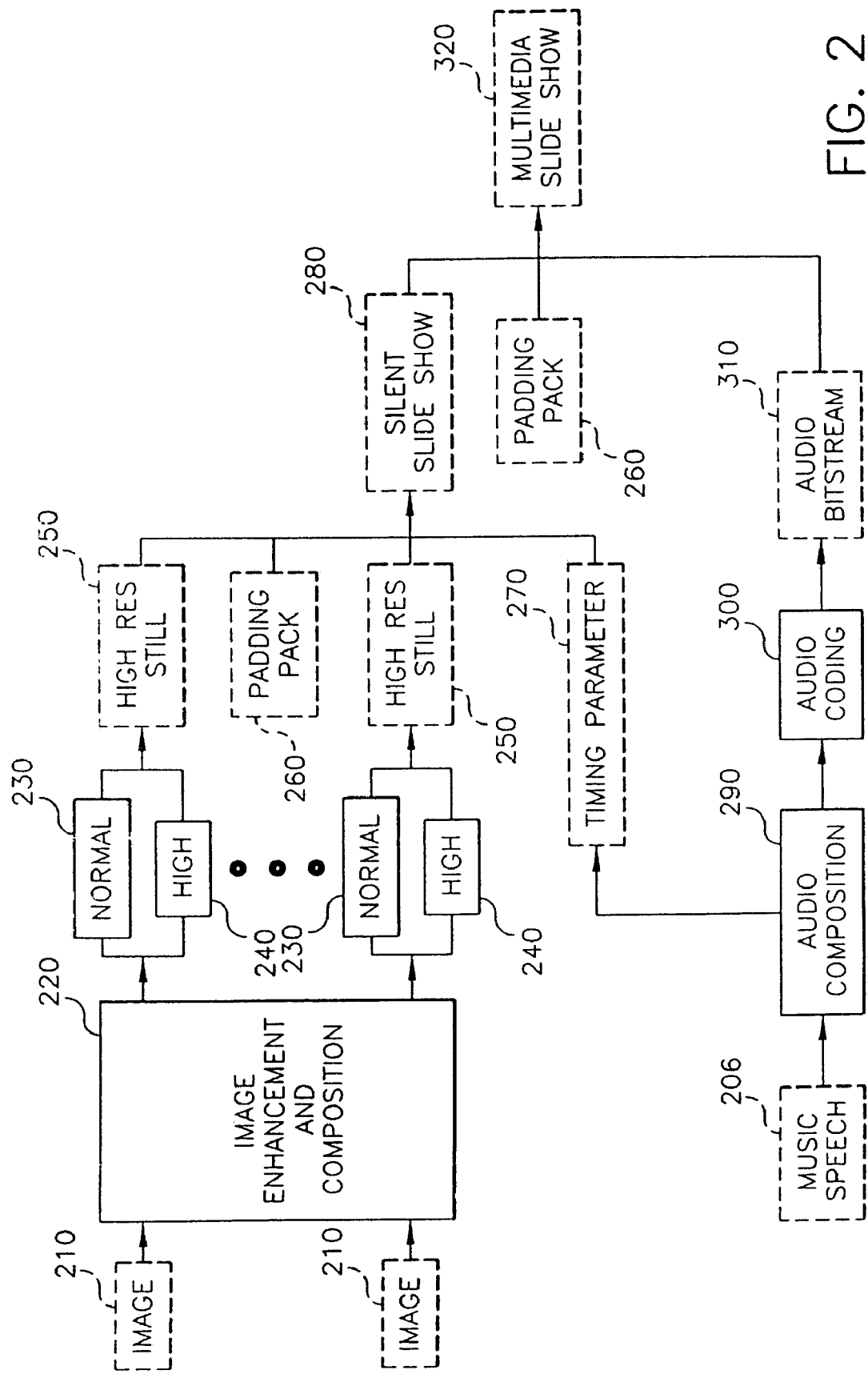
FIG. 2 shows a diagram of the composition of digital audio clips and digital images as a single mixed resolution still picture, a silent high resolution slide show displaying a number of still images sequentially, and a multimedia high resolution slide show with audio.

Referring now to FIG. 2, the method of the present invention is now described. FIG. 2 shows a diagram of the composition of digital audio clips and digital images as a single mixed resolution still picture, a silent high resolution slide show displaying a number of still images sequentially, and a multimedia high resolution slide show with audio. More particularly, as shown in FIG. 2, the method of composing a high resolution slideshow comprises five steps generally referred to as: 1) image enhancement and composition; 2) audio composition; 3) composition of a single mixed resolution still picture; 4) composition of a silent slideshow displaying a number of still images sequentially; and 5) composition of a multimedia slideshow with audio. The composed slideshow can be rendered/viewed back on a VCD/DVD player or a computer with a software/hardware player.

The coding of a single mixed resolution still picture (i.e., a digital still image) is now described with reference to FIG. 2. Reference number 210 denotes a plurality N of digital images to be composed. Using image enhancement and composition module 220 (which will be more particularly described below), each image 210 is first converted to YUV color space, subsampled to 4:2:0 format, divided into 8×8 blocks, and Huffman coded after DCT transform. More particularly, each channel is divided into 8×8 blocks and coded by 2-D Discrete Cosine Transform (DCT) to remove spatial correlation. Symbol redundancy is further removed by quantization and Huffman coding. This yields a DCT-coded picture in normal resolution 230 and a DCT-coded picture in high resolution 240. DCT-coded pictures in normal resolution 230 and high resolution 240 are then multiplexed/interleaved as a mixed resolution still picture 250 in accordance with VCD specification 2.0. The mixed resolution still picture 250 has a higher resolution than DCT-coded picture in normal resolution 230, so is therefore referred to as high resolution still picture 250. High-resolution still picture 250 can be viewed/rendered on a television by means of a VCD/DVD player with a spatial resolution of 704×480 on NTSC or 704×576 on PAL.

If a timing parameter 270 is available, the N input images can be further composed as a single silent high resolution slide show 280, as shown in FIG. 2. (It is noted that a default or predetermined value for timing parameter 270, such as 5 seconds, can be employed.) Timing parameter 270 specifies the time duration an image should stay on display 114 and maintain the synchronization between the audio and the video bitstreams. Timing parameter 270 can be specified through input device 118, selector 120, keyboard 116, user interaction, parameter files, or an audio composition module 290. To maintain a constant bit rate, a padding pack(s) 260 can be inserted between two high resolution still pictures 250, whereby the previous picture is displayed on display 114 for the specified number of seconds before it is switched to the next picture and the next picture is displayed on display 114. Padding packs 260 are packs filled with stuffing bytes 0xFF. The stuffing bytes do not have specific meaning, and are presented to maintain constant bit rate. A number of padding packs NP can be determined by a number of seconds of display T, a number of packs NN holding the DCT-coded normal resolution picture 230, and a number of packs NH holding the DCT-coded high resolution picture 240, in accordance with the following algorithm:

$$NP=T*75-(NN+NH)$$

wherein each second corresponds to 75 packs.

It is noted that timing parameter 270 does not need to be the same value for each image 210. That is, the time that each image 210 is displayed on display 114 can vary. For example, it may be desired to arrange the display time randomly. Alternatively, it may be desired to arrange the display time for each image based on the content of the image, with images of people being displayed for a time Time1 and images of scenery being displayed at a time Time2 different than Time1.

Still referring to FIG. 2, silent slide show 280 can be enhanced to include audio 206 thereby generating a multimedia slide show 320. To this end, audio 206 can comprise one or more background music clips 206 selected for the images with different ranges. For example, a music clip can be applied to images 210 N=1 to 10, silent for images 210 N=11 to 15, and another music clip applied to images 210 N=16 to 30. In addition, audio 206 can comprise speech annotation 206 applied to any images 210. For example, a user can speak into a microphone to record information about a particular image. Audio 206 is transmitted to audio composition module 290. Timing parameter(s) 270 from audio composition module 290 is used for generating silent slide show 280, and the normalized audio from 290 is passed to a digital audio encoding/compression module 300 to generate audio bitstream 310. The video bitstream from silent slide show 280 and audio bitstream 310 are multiplexed as single multimedia slide show 320 with audio. Multimedia slide show 320 can be presented from software, or alternatively, multimedia slide show 320 can be burned into a VCD or DVD for display using a VCD/DVD player. Reference is made to commonly assigned application U.S. Ser. No. 09/885,577 entitled "SYSTEM AND METHOD FOR AUTHORING A MULTIMEDIA ENABLED DISC", and filed on Jun. 20, 2001 in the names of Loui et al, and which is assigned to the assignee of this application.

Figure 3:
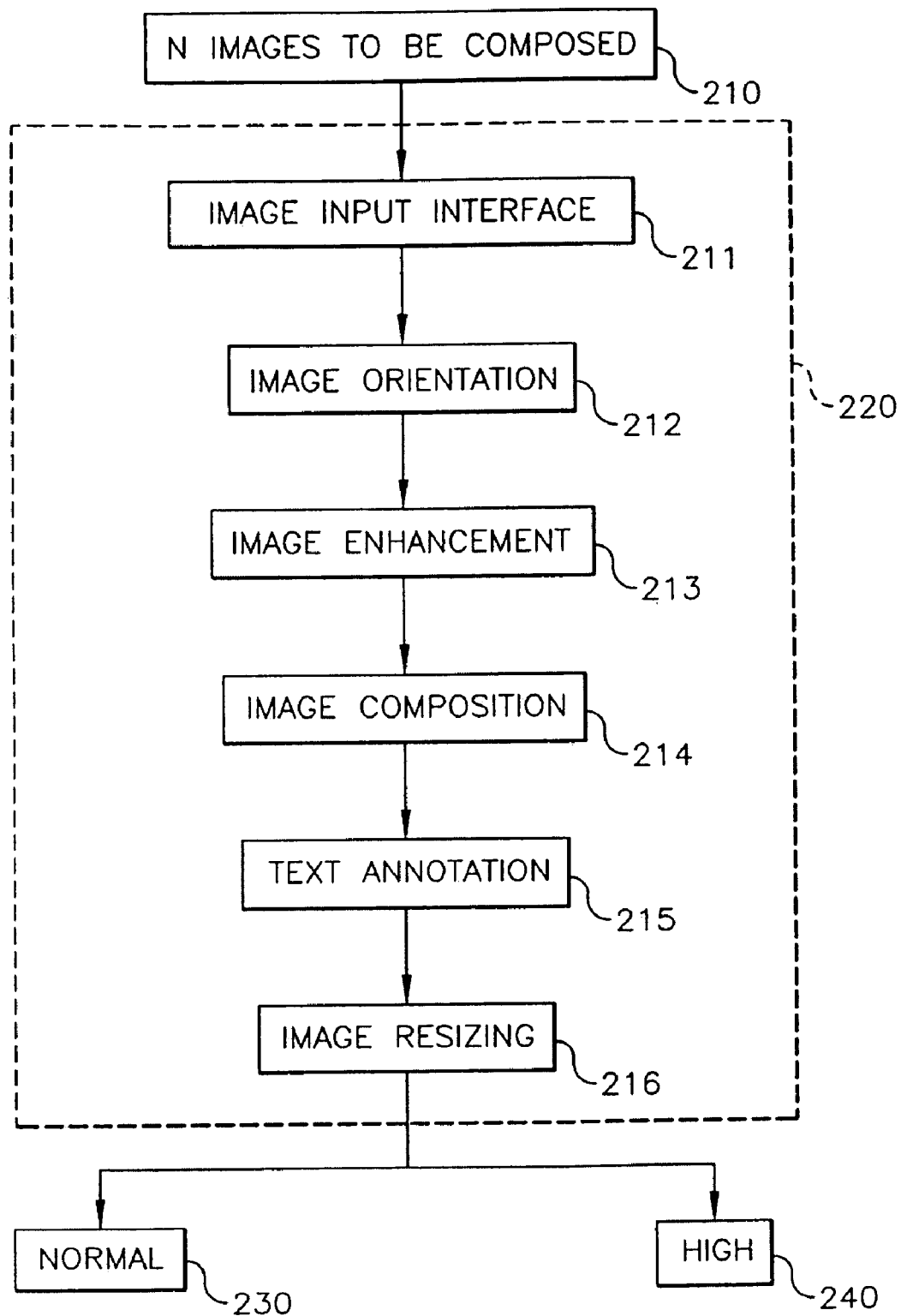
FIG. 3 shows a block diagram of the composition of still images.

FIG. 3 more particularly describes image enhancement and composition module 220. One objective is to prepare the image data with the right resolution, and the other objective is to enhance the image rendering quality. To this end, each image 210 is read into the computer memory through an image input interface 211. Image input interface 211 should be configured to accept commonly employed image file formats (such as JPEG, GIF, TIFF, BMP, and the like) as well as image data stored on various devices (such as hard disk, memory card, memory stick, flash card, compact disc, floppy disk, and the like). Each image 210 is first reoriented to a proper orientation 212 (e.g., portrait or landscape), which can be accomplished by user interaction or automated schemes from image through image analysis.

A variety of image enhancement algorithms 213 are applied to the image to enhance the image quality. Examples of such image enhancements include, but are not limited to, color balance, noise reduction, edge sharpening, red eye detection and correction, tone scale adjustment, and other typical image enhancement algorithms.

After image enhancements 213 are applied, other textures can be overlaid on the images as composite images 214. Examples of textures include background texture, frame decoration for the images, company logos, etc. Text annotation 215 (such as title, subject, who, when, where, etc.) can also be added to the image content. The image is then resized twice 216 to a normal resolution image and a high-resolution image with the same image content. Each version is encoded separately following MPEG-1 I-frame encoding syntax. As indicated above, DCT-coded picture in normal resolution 230 and DCT-coded picture in high resolution 240 are then yielded.

Figure 4:
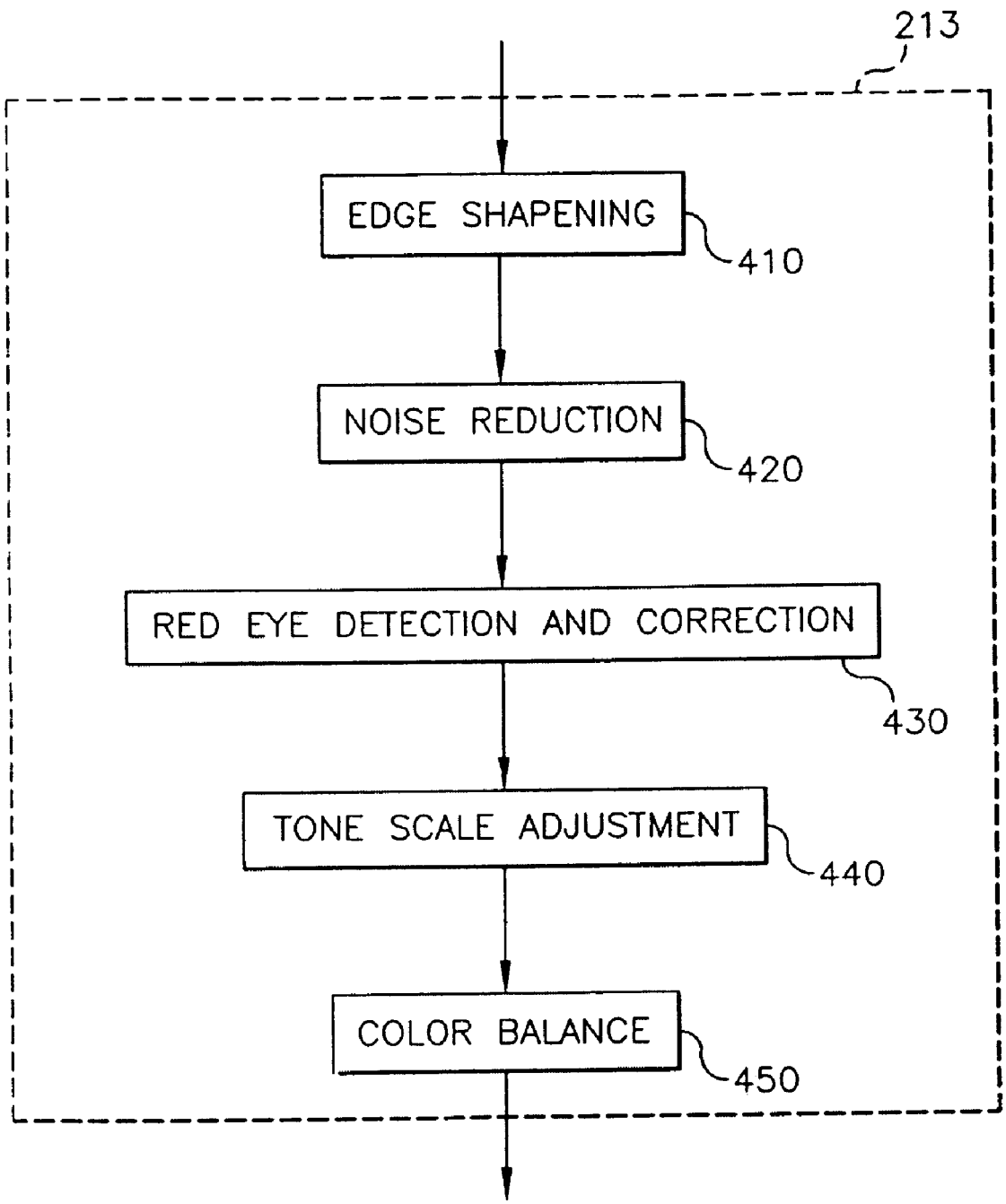
FIG. 4 shows various image enhancement operations.

FIG. 4 more particularly describes the operations of image enhancement 213. In particular, image enhancement 213 preferably initially includes image sharpening 410 by unsharp masking, i.e., subtracting a blurred version of the image from the original. Then, preferably, noise reduction 420 is accomplished using an enhanced black printing algorithm, i.e., adaptively filtering the image based on the noise factor indicated by the variance of high frequency channels. Image understanding algorithms can be applied to images to detect and correct red-eye 430. In addition, tone scale adjustment 440 and color balance 450 can be applied to enhance the image.

Figure 5:
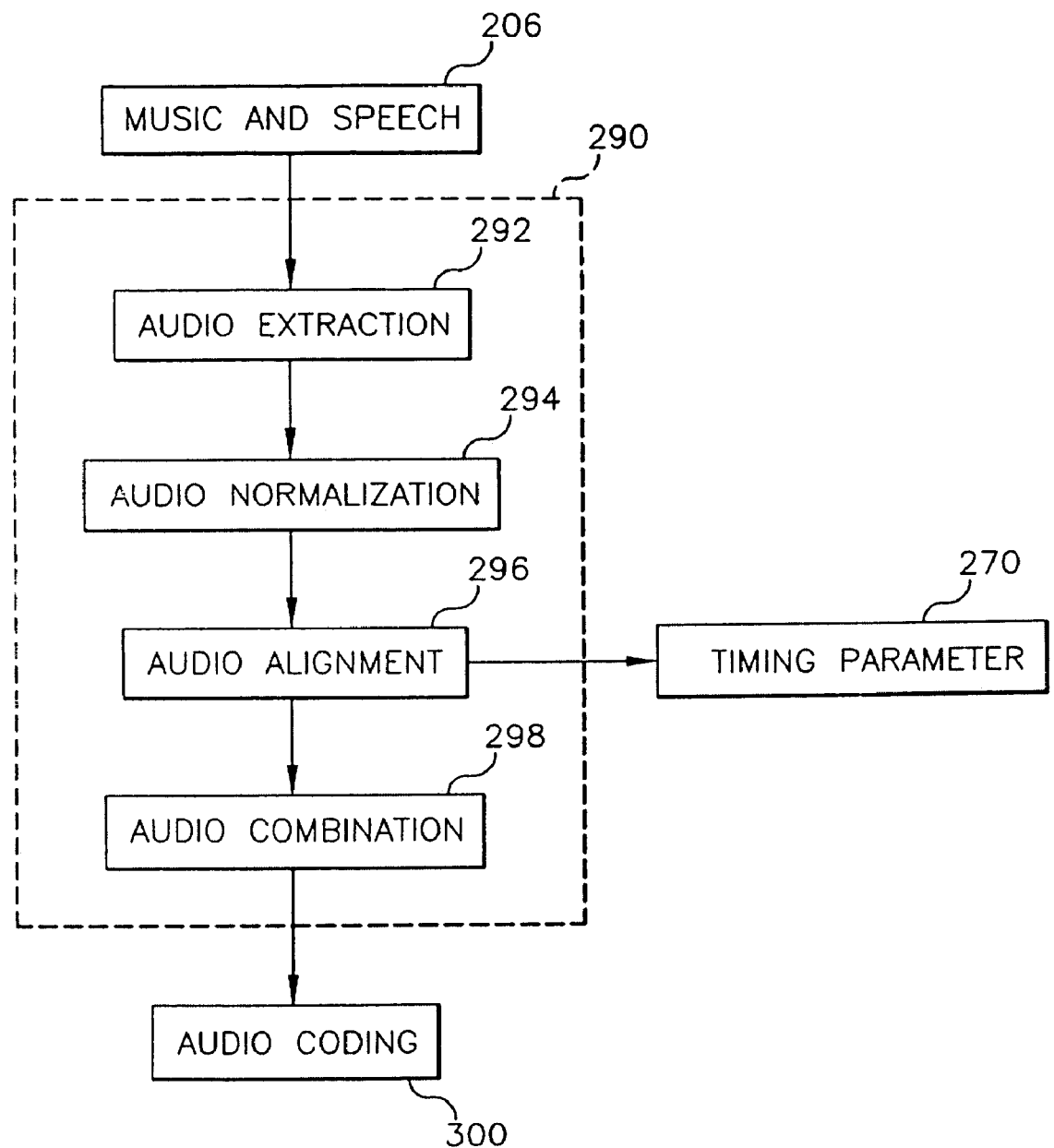
FIG. 5 shows a block diagram of the composition of digital music and voice annotation.

Audio composition module 290 is now more particularly described with reference to FIG. 5. Generally, audio composition module 290 combines multiple audio streams into a single normalized audio stream and automatically calculates the timing parameters for audio/video synchronization.

As indicated above, audio 206 can comprise one or more background music clips and/or speech annotation. Audio extraction 292 reads digital audio samples from external devices (for example, hard disk, compact disc, memory card, floppy disk, and the like) into the computer memory. The digital audio signal can be stored in a variety of file formats, such as Microsoft wave file, MPEG audio file (layers I, II and III), Apple/SGI Aiff file, NeXT/Sun au/snd file, SoundBlaster voc file, Turtle beach Sample Vision smp file, or streaming audio in raw format. The audio can be voice annotation, music clips, songs, or background sound.

The input audio streams are normalized in audio normalization 294 to a normalized specification, e.g., stereo, 16 bits/sample, 44.1 Khz. This normalization can comprise a change of sampling rate (e.g., from 8 Khz to 44.1 Khz), a change of sample precision (e.g., from 8 bits/sample to 16 bits/sample), a change of the number of channels (e.g., from mono to stereo), and/or a change of file format.

Following image normalization 294 is the step of audio alignment 296. More particularly, audio alignment registers multiple audio streams along the same temporal dimension and calculates timing parameter(s) 270. Each image 210 should appear when its corresponding audio/voice annotation starts, and each image 210 should be displayed until the audio/voice annotation ends. In addition, images should be distributed across the specified background music clip as uniformly as possible.

The audio alignment is now more particularly described with reference to an example wherein:

i is the image index for N input images 210, ti is the time duration in seconds for the i-th image on display, td is the default time duration in seconds for an image on display (e.g., 5 seconds), tm is the minimum time duration in seconds (e.g., 0.5 second), ts is the time duration for a music clip, and ai is the time duration in seconds for the voice annotation on the i-th image.

When no sound is selected for the plurality N of images (either music nor voice), then: ti=td, i=1, . . . , N. As such, each image 210 is displayed for td seconds and silent slide show 280 has a duration of td*N seconds.

When voice annotation is present and no background music is specified, the time duration for a specific image is determined by the time duration of the voice annotation on that image, specifically ti=td, if 0<=ai<td, otherwise ti=ai. In other words, if there is no voice annotation on an image, or the length of the annotation is less than the default time duration td, then ti takes the default value td. Otherwise, ti takes the actual voice annotation duration, i.e., an image is displayed on display 114 when there is a voice annotation.

When there is a single music or song and no voice annotation is present, each image is displayed for an equal amount of time, specifically, ti=ts/N. When multiple music clips are present, the music clips are preferably concatenated as a single music clip first. The rest follows the case for a single background music clip.

Where both a music clip and a voice annotation are specified for the plurality of images, there are three possible arrangements. (1) When the total time duration for all the voice annotations is longer than that of a music clip, the audio stream is padded with the same music clip (or zero audio samples). The rest follows the situation with annotation only. (2) When a long music clip is selected (i.e., sufficiently long in duration to fit all voice annotation in the average time duration), then ti=ts/N. This is similar to the situation with music clips only. (3) The third arrangement provides some complexity, specifically, when some voice annotations are longer in duration than the average time duration and the total voice annotation duration is shorter than the music clip duration. In this arrangement, a recursive scheme is preferably employed to assign a time duration for an image one at a time. An image takes either the annotation time duration or the default time duration. The time assigned for one of the N images is subtracted from the total available time for the rest (N−1) images. The process is repeated until time durations are assigned to all the images.

After audio alignment 296 is accomplished, the audio samples from different audio streams are combined together as a single stream with specified emphasis in the audio combination module 298. At each time instance, audio sample x is taken as a linear combination of the voice annotation x1 and background music/song x2:

$$x=(a)(x1)+(1-a)(x2),$$

wherein a is a weight between 0 and 1. When there is voice annotation, the background music/song volume is lowered to emphasize the foreground voice annotation.

Figure 6:
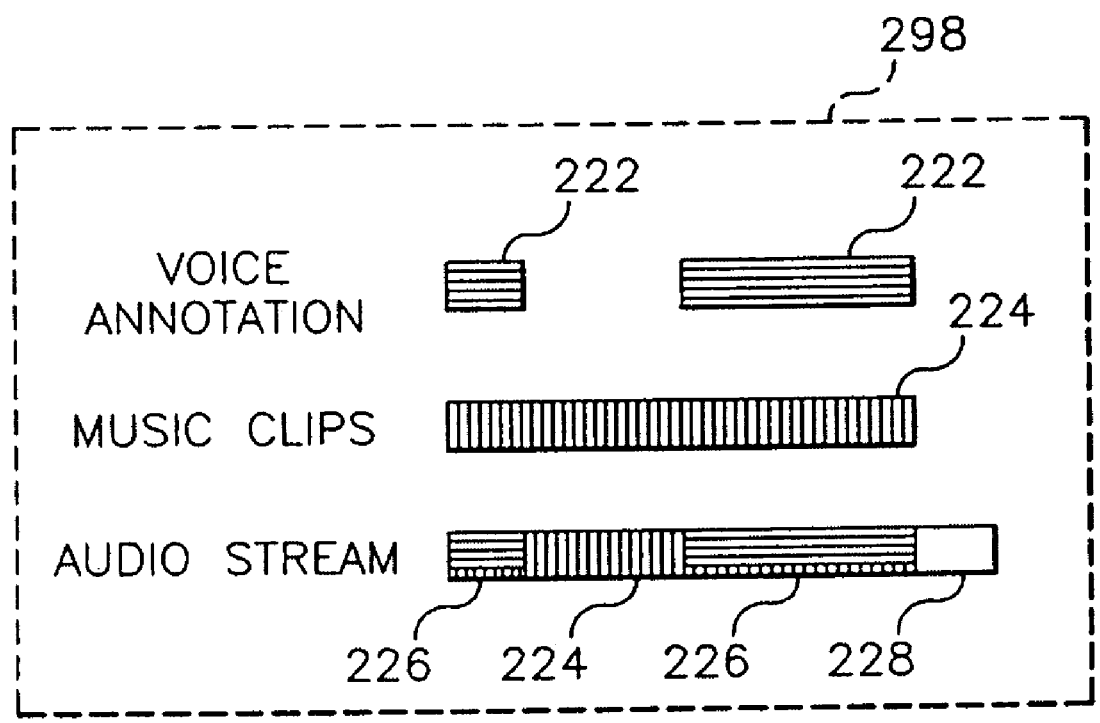
FIG. 6 shows audio combination and voice annotation and background music.

An illustration of audio combination is shown in FIG. 6. Audio samples from voice annotation 222 are emphasized in combined audio stream 226. The volume of the background music is lowered (from normal) when there is voice annotation, and is raised to normal after the voice annotation is complete. The transition of the audio samples can be implemented as smooth transition, gradually from low to high and from high to low.

Accordingly, audio composition module 290 provides a normalized audio, which is passed to digital audio encoding/compression module 300 to generate audio bitstream 310.

Figure 7:
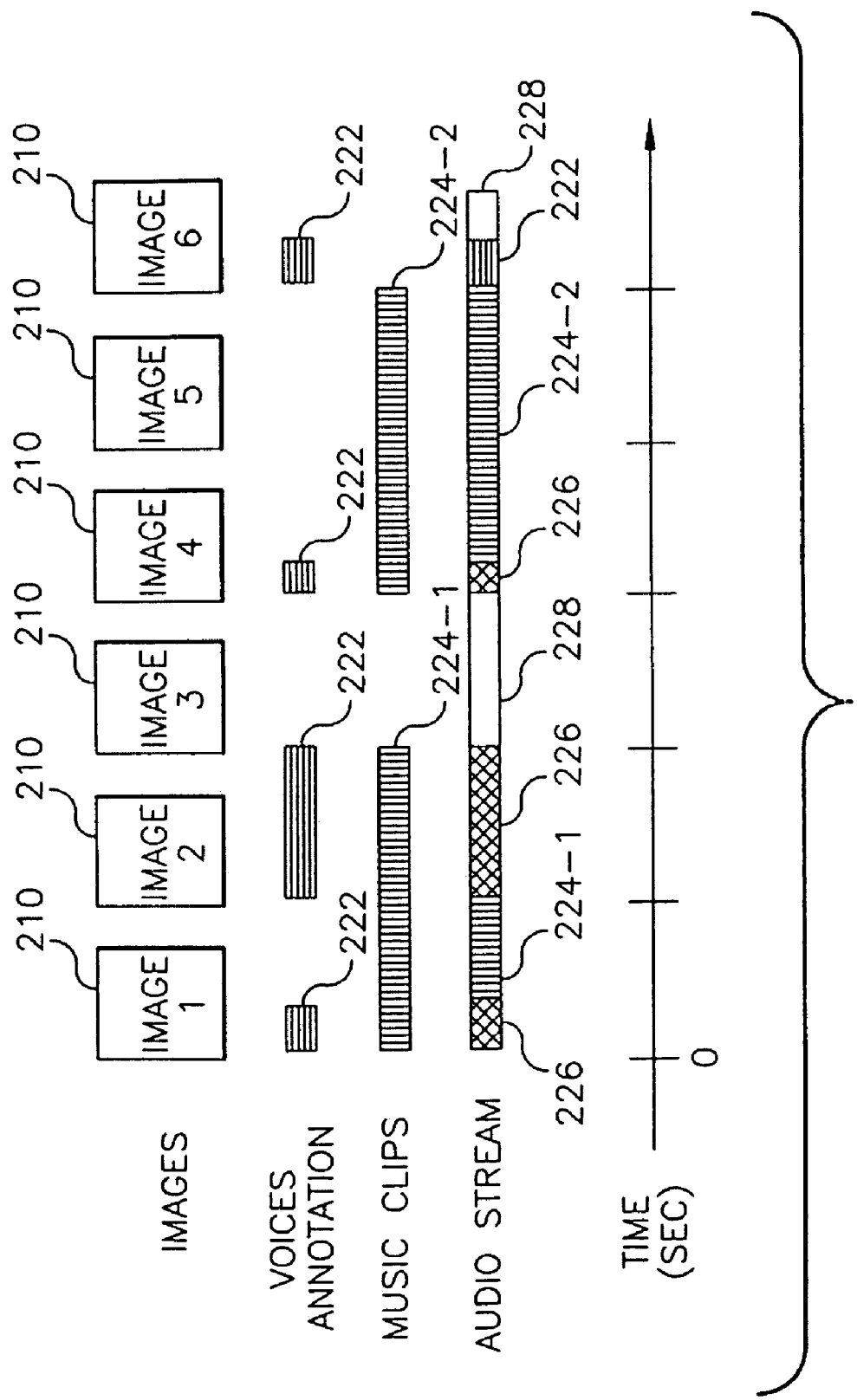
FIG. 7 shows an example of an audio composition in accordance with the present invention.

Referring now to FIG. 7, an example is provided of audio composition. FIG. 7 shows a plurality of 6 input images 210, N=1-6. Voice annotations 222 are applied on images 1, 2, 4 and 6. Two music/song clips 224 have been specified, one on images 1-2 and the other on images 4-5. For this particular example, there is (i) no audio specified for image 3, (ii) voice annotation only for image 6, (iii) music clip only for image 5, and (iv) both voice annotation and music clips on images 1, 2 and 4. The final composed audio stream, composed in accordance with the present invention, is shown in FIG. 7. More particularly, music clip 224-1 plays when images 1 and 2 are on display. The music volume is lowered when the voice annotations are played during the display of images 1 and 2.

Image 3 is rendered without any audio, and it stays for td seconds as specified by the default time duration. Music clip 224-2 is played when images 4 and 5 are displayed on display 114. Image 6 is displayed for td seconds on display 114, the first a6 seconds with voice annotation, and the remainder silent. More specifically, reference number 226 refers to a time when there is combined audio with a voice annotation over a music clip, and reference number 228 refers to a time when there is no audio (i.e., no voice annotation or music clip).

It is noted that each image of the example shown in FIG. 7 was displayed at an equal amount of time, as shown by the time line in FIG. 7. However, as indicated above, the present invention can be practiced wherein the display time for each image varies.

Figure 8:
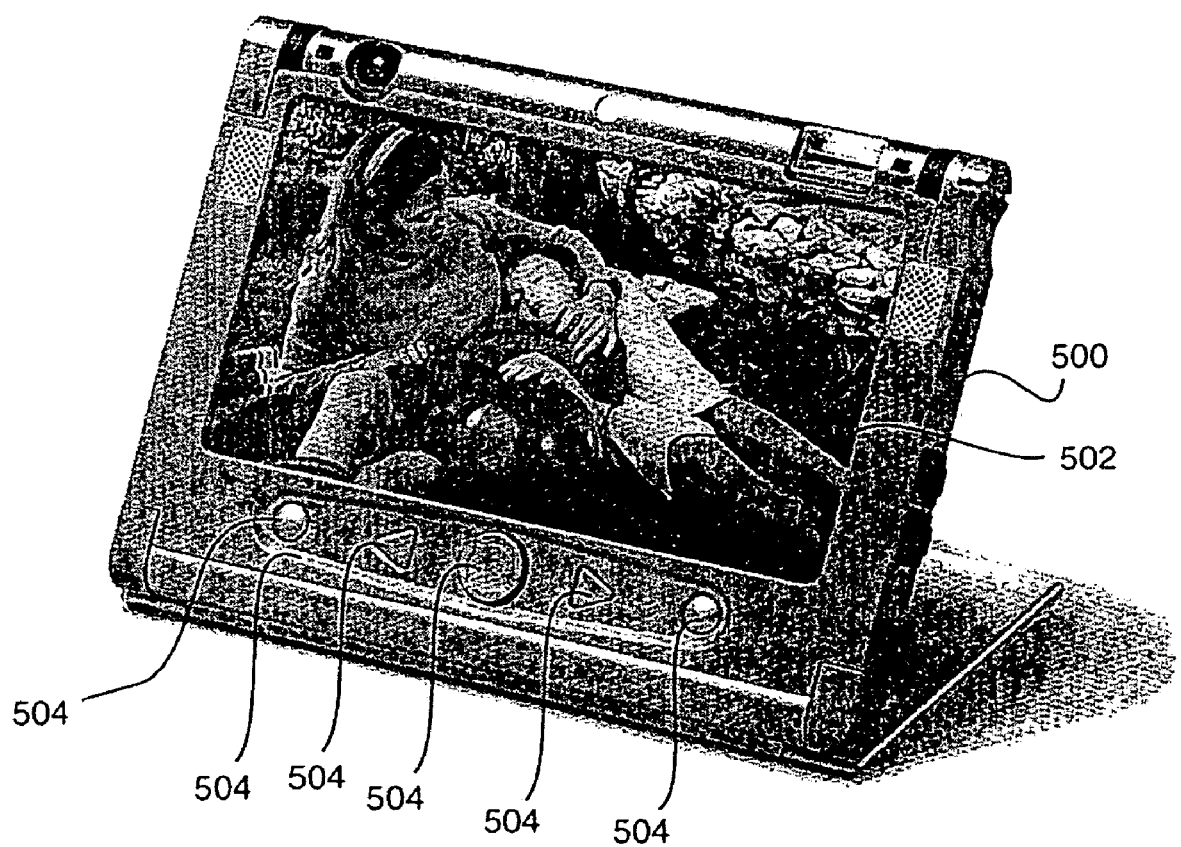
FIG. 8 generally illustrates a digital camera, which can be employed to practice the method of the present invention.
Figure 9:
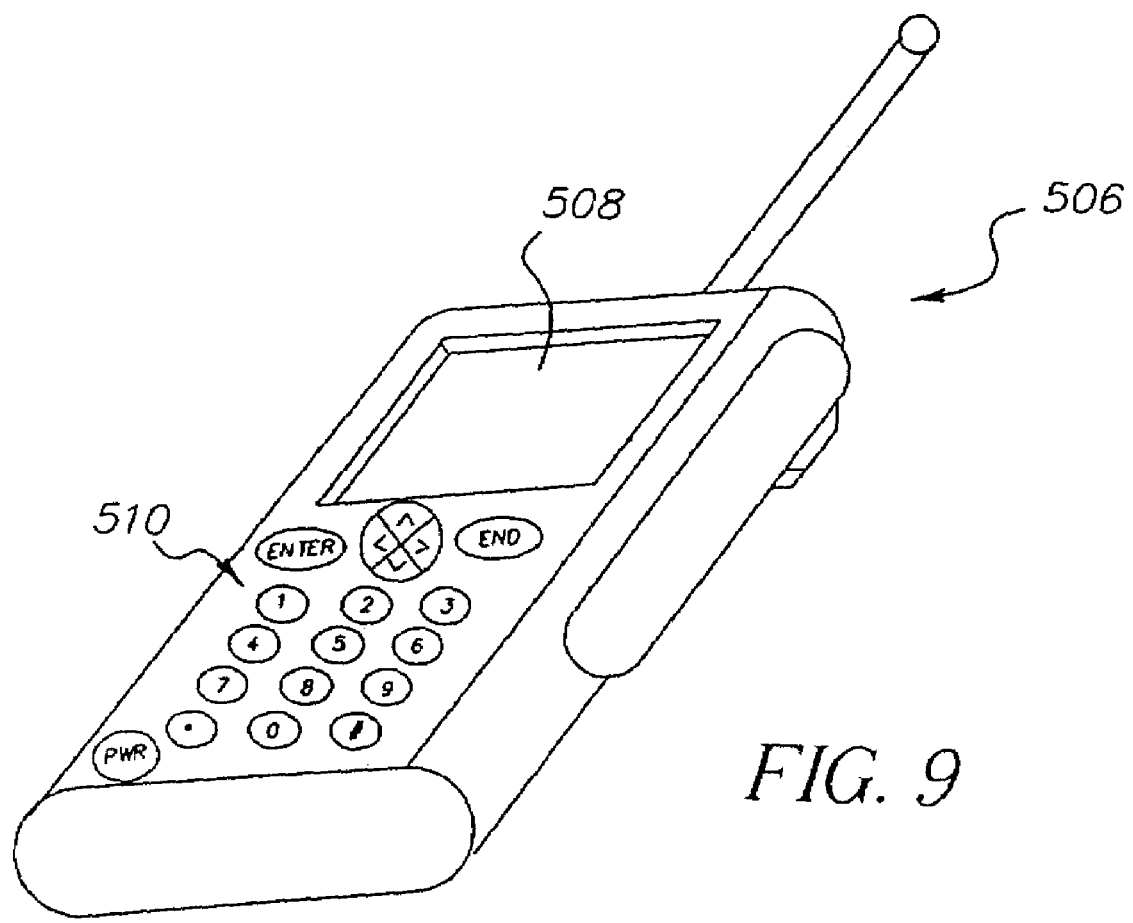
FIG. 9 generally illustrates a cellular/mobile phone, which can be employed to practice the method of the present invention.

System 110 of the present invention can be a digital camera, PDA (personal digital assistant), or a cellular/mobile phone. For example, FIG. 8 shows a digital camera 500 having a display 502 and selection members 504. If digital camera 500 has a microprocessor (CPU), memory, and audio capability, digital camera 500 can practice the method of the present invention. Similarly, FIG. 9 shows a cellular/mobile phone 506 having a display 508 and selection members 510. If cellular/mobile phone 506 has a microprocessor (CPU), memory, and audio capability, cellular/mobile phone 506 can also practice the method of the present invention. Communication can be accomplished over a network known to those skilled in the art, for example a wireless network, internet, or telephone line.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 110 system
112 microprocessor-based unit
114 display
116 keyboard
118 mouse; input device
120 selector on display
122 disc drive unit
124 compact disc-read only memory
125 external network
126 floppy disk
127 network connection
128 printer
130 PC card
132 PC card reader
134 digital camera
136 digital camera docking port
138 cable connection
140 wireless connection
206 digital audio (e.g. music clip or voice annotation)
210 digital images
211 image input interface
212 image orientation
213 image enhancement
214 image composition/composites
215 text annotation
216 image resizing
220 image enhancement and composition module
222 voice annotation
224 music clip
226 combined audio with voice annotation over music clip
228 silent audio
230 DCT-coded picture in normal resolution
240 DCT-coded picture in high resolution
250 mixed resolution high resolution still picture
260 padding pack
270 timing parameter
280 silent slide show
290 audio composition module
292 audio extraction
294 audio normalization
296 audio alignment
298 audio combination module
300 digital audio encoding module
310 audio bitstream
320 multimedia slide show, with audio
410 edge sharpening
420 noise reduction
430 red-eye detection and correction
440 tone scale adjustment
450 color balance
500 digital camera
502 display
504 selection members
506 cellular/mobile phone
508 display
510 selection members

What is claimed is:

1. A method of composing a slide show, comprising the steps of:

accessing a plurality of digital images;

encoding each of the plurality of digital images to generate a normal resolution image portion and a high resolution image portion;

multiplexing each corresponding normal and high resolution image portion to generate a single high resolution still image;

determining a time parameter for each of the high resolution still images; and concatenating the plurality of high resolution still images to generate a silent slide show in accordance with the determined time parameters and employing at least one padding pack, wherein the number of padding packs NP is determined by the algorithm:

$$NP=T*75-(NN+NH)$$

wherein T is a number of seconds of display, NN is a number of packs holding the normal resolution image portion, and NH is a number of packs holding the high resolution image portion.

2. The method of claim 1, further comprising the step of generating a VCD or DVD comprising the silent slide show whereby the slide show can be viewed using a VCD player or DVD player.

3. The method of claim 1, wherein the slide show is adapted to be viewed on a computer.

4. The method of claim 1, wherein each of the plurality of digital images is encoded using MPEG-1.

5. The method of claim 4, wherein each of the plurality of digital images is encoded using MPEG-1 I-frame encoding.

6. The method of claim 1, further comprising the step of image enhancing at least one of the plurality of digital images.

7. The method of claim 6, wherein the step of image enhancing comprises the step of including text annotation.

8. The method of claim 6, wherein the step of image enhancing comprises the steps of:
   orienting the digital image;
   applying an image enhancement algorithm; and
   resizing the digital image.

9. The method of claim 8, wherein the step of applying an image enhancement algorithm includes the steps of:
   sharpening the digital image; and
   filtering the digital image to reduce noise.

10. The method of claim 9, wherein the step of sharpening the digital image is accomplished by unsharp masking.

11. The method of claim 8, wherein the step of applying an image enhancement algorithm includes the step of applying a red-eye defect correction algorithm if a red-eye defect is detected.

12. The method of claim 8, wherein the step of applying an image enhancement algorithm includes the step of applying a color balance algorithm.

13. The method of claim 1, wherein the step of multiplexing is accomplished by interleaving the normal resolution image portion and the high resolution image portion.

14. A method of composing a multimedia slide show, comprising the steps of:
   selecting a plurality of digital images;
   encoding each of the plurality of digital images to generate a normal resolution image portion and a high resolution image portion;
   multiplexing each corresponding normal and high resolution image portion to generate a single high resolution still image;
   determining a time parameter for each of the high resolution still images;
   selecting an audio portion for at least one of the plurality of digital images;
   concatenating the plurality of high resolution still images to generate a video bitstream;
   generating an audio bitstream by encoding the audio portion; and
   multiplexing the video bitstream and audio bitstream to generate the multimedia slide show and employing at least one padding pack, wherein the number of padding packs NP is determined by the algorithm:

$$NP=T*75-(NN+NH)$$

wherein T is a number of seconds of display, NN is a number of packs holding the normal resolution image portion, and NH is a number of packs holding the high resolution image portion.

15. The method of claim 14, further comprising the step of generating a VCD or DVD comprising the silent slide show whereby the slide show can be viewed using a VCD player or DVD player.

16. The method of claim 14, wherein the slide show is adapted to be viewed on a computer.

17. The method of claim 14, wherein each of the plurality of digital images is encoded using MPEG-1.

18. The method of claim 17, wherein each of the plurality of digital images is encoded using MPEG-1 I-frame encoding.

19. The method of claim 14, further comprising the step of image enhancing at least one of the plurality of digital images.

20. The method of claim 19, wherein the step of image enhancing comprises the step of including text annotation.

21. The method of claim 19, wherein the step of image enhancing comprises the steps of:
   orienting the digital image;
   applying an image enhancement algorithm; and
   resizing the digital image.

22. The method of claim 21, wherein the step of applying an image enhancement algorithm includes the steps of:
   sharpening the digital image; and
   filtering the digital image to reduce noise.

23. The method of claim 22, wherein the step of sharpening the digital image is accomplished by unsharp masking.

24. The method of claim 21, wherein the step of applying an image enhancement algorithm includes the step of applying a red-eye defect correction algorithm if a red-eye defect is detected.

25. The method of claim 21, wherein the step of applying an image enhancement algorithm includes the step of applying a color balance algorithm.

26. The method of claim 14, wherein the step of selecting an audio portion comprises the step of selecting a music clip.

27. The method of claim 14, wherein the step of selecting an audio portion comprises the step of providing a voice annotation.

28. The method of claim 14, wherein the step of generating an audio bitstream comprises the step of normalizing the audio portion.

29. The method of claim 14, wherein the step of generating an audio bitstream comprises the step of aligning the audio portion.

30. A method of composing a multimedia slide show, comprising the steps of:
   selecting a plurality of digital images;
   encoding each of the plurality of digital images to generate a normal resolution image portion and a high resolution image portion;
   multiplexing each corresponding normal and high resolution image portion to generate a single high resolution still image;
   determining a time parameter for each of the high resolution still images;
   selecting an audio portion for at least one of the plurality of digital images, comprises the steps of:
      selecting a music clip and a voice annotation for one of the plurality of digital images; and
      generating a single audio sample in accordance with the algorithm $x=(a)(x1)+(1-a)(x2)$, wherein x1 is the selected voice annotation, x2 is the selected music clip, x is a linear combination of the selected voice annotation and selected music clip, and a is a value between 0 and 1;
   concatenating the plurality of high resolution still images to generate a video bitstream;
   generating an audio bitstream by encoding the audio portion; and
   multiplexing the video bitstream and audio bitstream to generate the multimedia slide show.

* * * * *